(12) United States Patent
Yoshida

(10) Patent No.: US 6,339,475 B1
(45) Date of Patent: Jan. 15, 2002

(54) DISTANCE MEASUREMENT SYSTEM

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/405,172

(22) Filed: Sep. 24, 1999

(30) Foreign Application Priority Data

Sep. 29, 1998 (JP) .......................................... 10-275593

(51) Int. Cl.$^7$ ............................................... G01B 11/14
(52) U.S. Cl. ...................... 356/614; 356/3.04; 396/106; 396/120
(58) Field of Search ................................ 356/375, 3.01, 356/3.02, 3.03, 3.04, 3.05, 3.06, 3.07; 396/106, 120

(56) References Cited

U.S. PATENT DOCUMENTS

| | | | |
|---|---|---|---|
| 5,493,362 A | * 2/1996 | Nonaka | ....................... 396/106 |
| 5,659,387 A | 8/1997 | Yoshida | ....................... 356/4.01 |
| 5,832,324 A | * 11/1998 | Shimizu et al. | ............. 396/106 |

FOREIGN PATENT DOCUMENTS

JP          07181038       *  7/1995

\* cited by examiner

Primary Examiner—Frank G. Font
Assistant Examiner—Sang H. Nguyen
(74) Attorney, Agent, or Firm—Leydig, Voit, & Mayer, Ltd.

(57) ABSTRACT

A distance measurement system for measuring a distance with high accuracy and decreasing the number of terminals and lines. The system includes a charging device for detecting whether a supply of power has started and for overcharging an integrating capacitor for a definite period of time after the starting of the power supply. When the power supply to an automatic focussing integrated circuit starts, the charging device detects the start and outputs a signal to command overcharging of the integrating capacitor for the definite period of time after the detection. After the overcharging for the definite period of time, the integrating capacitor is charged to the reference voltage and an infrared-emitting diode emits pulsed radiation. The distance measurement results for each pulse are integrated by the discharging of the integrating capacitor.

9 Claims, 6 Drawing Sheets

DISTANCE MEASUREMENT SYSTEM

BACKGROUND OF THE INVENTION

1. Field of the Invention

The present invention relates to a system for measuring a distance to an object of distance measurement and more particularly to an active distance measurement system favorably applied to various types of cameras.

2. Related Background Art

Such an active distance measurement system applied to cameras generally includes an infrared-emitting diode (IRED) for emitting a beam of light toward an object of distance measurement, and a position sensitive detector (PSD) for receiving the emitted and reflected light beam. The signal outputted from the PSD is processed in signal processing and arithmetic circuits to be inputted therefrom as distance information into a central processing unit (CPU), by which a distance to the distance measurement object is determined. Because an error may occur in distance measured based on one-shot light emission alone, multi-shot light emissions are generally employed to obtain multiple pieces of distance information. The obtained information is typically integrated and averaged in an integrating circuit.

FIG. 1 shows a circuit diagram illustrating a configuration of the integrating circuit in the above distance measurement system. The integrating circuit generally shown at 16 comprises a switch 1, an integrating capacitor 2, a switch 3, a constant current source 4, an operational amplifier 5, a switch 6, a reference power source 7, a comparator 8, and a switch 9. The inverting terminal (−) of the operational amplifier 5 is connected through the switch 1 to the output terminal of an arithmetic circuit (not shown) and grounded through the integrating capacitor 2. Also, the amplifier inverting terminal (−) is connected through the switch 3 to the constant current source 4, through the switch 9 to the terminal of a power supply voltage $V_{CC}$, and through the switch 6 to the output terminal of the operational amplifier 5. The non-inverting terminal (+) of the operational amplifier 5 is connected to the reference power supply 7, which provides a reference voltage $V_{REF}$. The comparator 8 is connected to the junction between the inverting terminal (−) of the operational amplifier 5 and the integrating capacitor 2 and compares the potential of the junction and the reference voltage $V_{REF}$ to find out which is higher. The comparator 8 outputs a signal corresponding to the comparison results. A not shown central processing unit (CPU) receives the signal outputted from the comparator 8 and controls the on-off operation of the switches 1, 3, 6 and 9.

FIG. 2 shows timing chart 40 explaining changes in voltage level of the integrating capacitor 2 with time in the prior distance measurement system. In the integrating circuit 16, when a release button is half- or partially-depressed after the main power source is turned on, the switch 9 is put in an "on" state only for a constant period of time under the control of the aforementioned CPU to cause the integrating capacitor 2 to be excessively charged to the power source voltage $V_{CC}$. Even after the switch 9 is turned to the "off" state, the switch 6 is maintained in an "on" state for another period of time so that the integrating capacitor 2 is charged up to the reference voltage $V_{REF}$ provided by the reference power source 7. After the charging up, the switch 6 is turned to the "off" state.

Then, the IRED emits pulsed infrared light and the switch 1 is turned to the "on" state for each constant time during the emission duration. As a result, the integrating capacitor 2 accepts from the arithmetic circuit an output signal thereof as a negative voltage, which corresponds to each emitted infrared light pulse. Thus, as shown in the timing chart 40 of FIG. 2, the voltage of the integrating capacitor 2 decrementally changes step by step in value corresponding to a distance. This is called a "first integration".

After the predetermined number (e.g., 256) of negative voltage inputs (discharges) into the integrating capacitor 2 are completed, the switch 3 is turned to. the "on" state by the control signal from the CPU, whereby the integrating capacitor 2 is charged at a constant rate defined by the rating of the constant current source 4. This is called a "second integration".

During the period of the second integration, the comparator 8 always compares the voltage level of the integrating capacitor 2 and the reference voltage $V_{REF}$ to find out which is higher and when determined that they are coincident with each other, causes the switch 3 to be turned to the "off" state. This causes the charging of the integrating capacitor 2 to be stopped and the CPU to commence determining a time required to perform the second integration. As the charging by the constant current source 4 is uniform in rate, the sum of the signal voltages inputted in the integrating capacitor 2 during one distance measurement, that is, the distance to the object of the distance measurement can be determined from the aforementioned time required to perform the second integration. In the subsequent distance measurement, as the required charging of the integrating capacitor 2 has been realized by the constant current source 4, the switch 3 may be retained in the open state, unless the constant current source 4 is provided in use for a long time.

In the active distance measurement system as explained above, it is desired to use a low-cost ceramic condenser as an integrating capacitor for the integrating circuit 16 because of the requirements for decrease of production cost. However, the ceramic condenser encounters the problem of a drop in charged voltage due to dielectric absorption. That is, the capacitor 2 forms an equivalent circuit shown in FIG. 3 immediately after the start of the first charging. Because of this, in FIG. 3, when a switch SW is turned to "off" after the first charging, the voltage drop due to a resistance element Rx is observed. Such a phenomenon is called "dielectric absorption", which may constitute one of the factors causing an error in distance measurements.

Thus, in the aforementioned active distance measurement system, the CPU instructs at the start of the distance measurement that the switch 9 is turned to "on" for the predetermined period of time to overcharge the integrating capacitor 2 to the voltage level higher than the reference voltage so that the voltage drop due to the dielectric absorption forcedly occurs in the integrating capacitor 2. Because the system operates in such a manner, no voltage drop occurs in the integrating capacitor 2 due to dielectric absorption during the distance measurement, thus preventing the occurrence of the distance measurement error with the result that the dielectric absorption problem can be solved.

SUMMARY OF THE INVENTION

However, the above distance measurement system must accomplish, under the instruction from the CPU, not only the operations to turn the switch 6 to the "on" state to charge up the integrating capacitor 2 to the reference voltage $V_{REF}$, to control the on-off action of the switch 1 to perform the first integration, and to turn the switch 3 to the "on" state to perform the second integration, but also the operation to turn the switch 9 to the "on" state to overcharge the integrating capacitor 2. As a result, complicated wiring is required to transmit the control signals representative of the instruction from the CPU. Furthermore, when the aforementioned signal processing circuit, arithmetic circuit and integrating circuit are consolidated into an integrated circuit, terminals in the integrated circuit increase in number.

The present invention has been made in order to overcome the above drawbacks and has for its object to provide a distance measurement system, which can measure a distance with high accuracy and can decrease the numbers of terminals and lines.

With the above object in view, the invention provides a distance measurement system comprising: (1) means for emitting a beam of light toward an object of distance measurement; (2) means including a position sensitive detector for receiving the beam of light emitted toward and reflected from the object at a receiving position on said position sensitive detector corresponding to a distance to the object, said light receiving means outputting a signal corresponding to the receiving position; (3) arithmetic means for carrying out a calculation based on the signal outputted from said light receiving means to output a signal corresponding to the distance to the object; (4) means including an integrating capacitor charged to a reference voltage for integrating the signal outputted from said arithmetic means over time by charging or discharging said integrating capacitor by an amount corresponding to the signal outputted from said arithmetic means, said integrating means outputting a signal corresponding to the results of the integration; (5) means for determining the distance to the object based on the signal outputted from said integrating means; and (6) charging means detecting whether a supply of power is started for overcharging said integrating capacitor of said integrating means to a voltage level higher than the reference voltage for a constant period of time after the start of the power supply.

With the arrangement of this distance measurement system, by the charging means detecting the start of the supply of power, the integrating capacitor of the integrating means is overcharged for the predetermined period of time after the detection to the voltage level higher than the reference voltage. During the subsequent distance measurement, the beam of light is outputted from the emitting means toward the object of distance measurement and reflected by the latter. The reflected light is received by the receiving means at the receiving position on the position sensitive detector corresponding to the distance to the object, and the light receiving means outputs the signal corresponding to the receiving position. The arithmetic means carries out the calculation based on the signal outputted from the light receiving means and outputs the signal corresponding to the distance to the object. The signal outputted from the arithmetic means is inputted into the integrating means and the integrating capacitor thereof charged to the reference voltage integrates the signal outputted from the arithmetic means over time by discharging from the integrating capacitor by an amount corresponding to the signal outputted from the arithmetic means. The integrating means outputs the signal corresponding to the results of the integration. The detecting means determines the distance to the object based on the signal outputted from the integrating means.

According to the preferred embodiment of the present invention, the distance measurement system further comprises control means for setting the system in a standby mode by suspending the supply of power thereto when no operation is carried out during a predetermined period of time and for releasing the standby mode to restart the supply of power when any operation is carried out during the period of the standby mode. The charging means detects whether the standby mode is released, and it overcharges the integrating capacitor of the integrating means to a voltage level higher than the reference voltage for a constant period of time after the release of the standby mode. In this embodiment, the integrating capacitor of the integrating means is overcharged, by the charging means detected the release of the standby mode, to the voltage level higher than the reference voltage for the constant period of time after the standby mode release. The subsequent distance measurement is performed in the similar manner.

As described in the foregoing, when the charging means detects the start of the power supply or the release of the standby mode, the integrating capacitor of the integrating means is overcharged by the charging means for the predetermined period of time after the detection to the voltage level higher than the reference voltage. During the overcharging, the voltage drop occurs due to the dielectric absorption in the integrating capacitor, resulting in high accuracy of distance measurement accomplished subsequent to the overcharging. Furthermore, as no additional signals are required to command the overcharging of the integrating capacitor, terminals and wiring may be simplified when the associated elements are incorporated into an integrated circuit.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
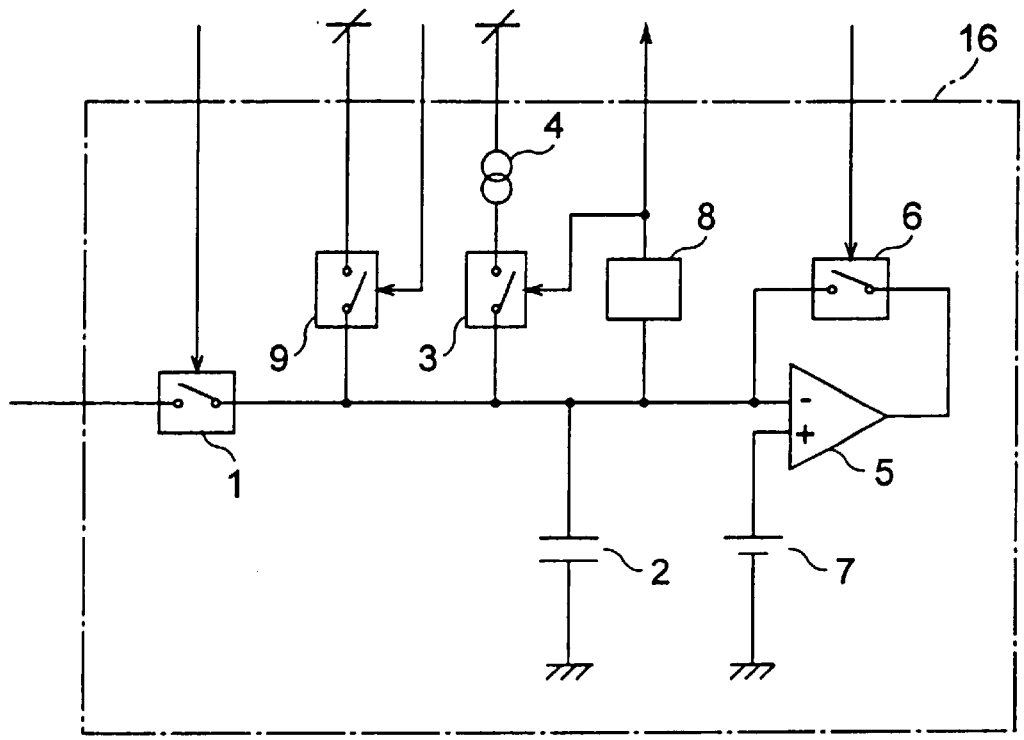
FIG. 1 is a diagram showing an integrating circuit in a prior distance measurement system, which circuit may also be incorporated in the distance measurement system of FIG. 4.
Figure 2:
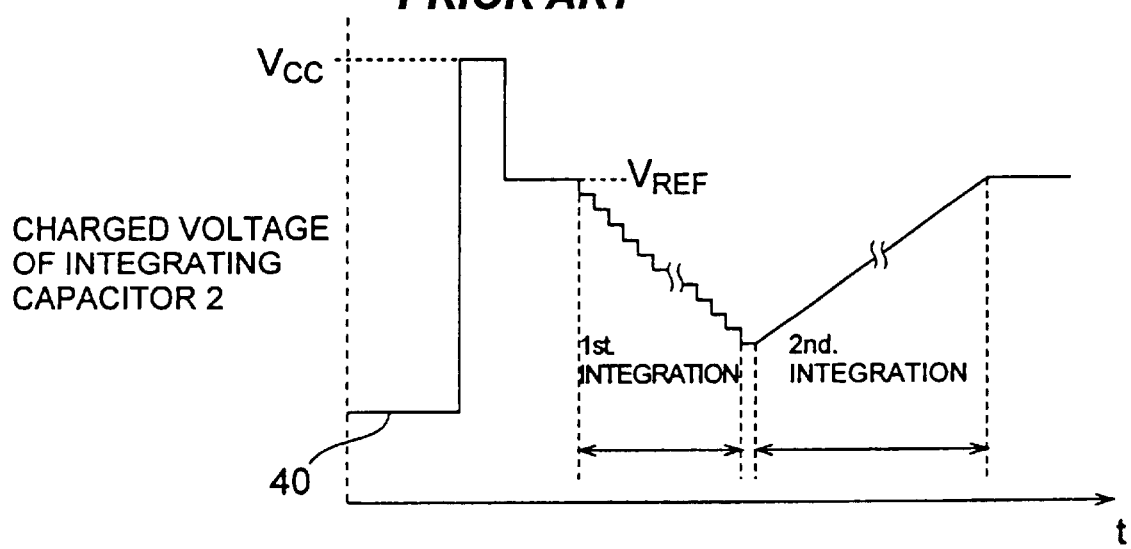
FIG. 2 is a timing chart showing a change in voltage with time of an integrating capacitor in the prior distance measurement system.
Figure 3:
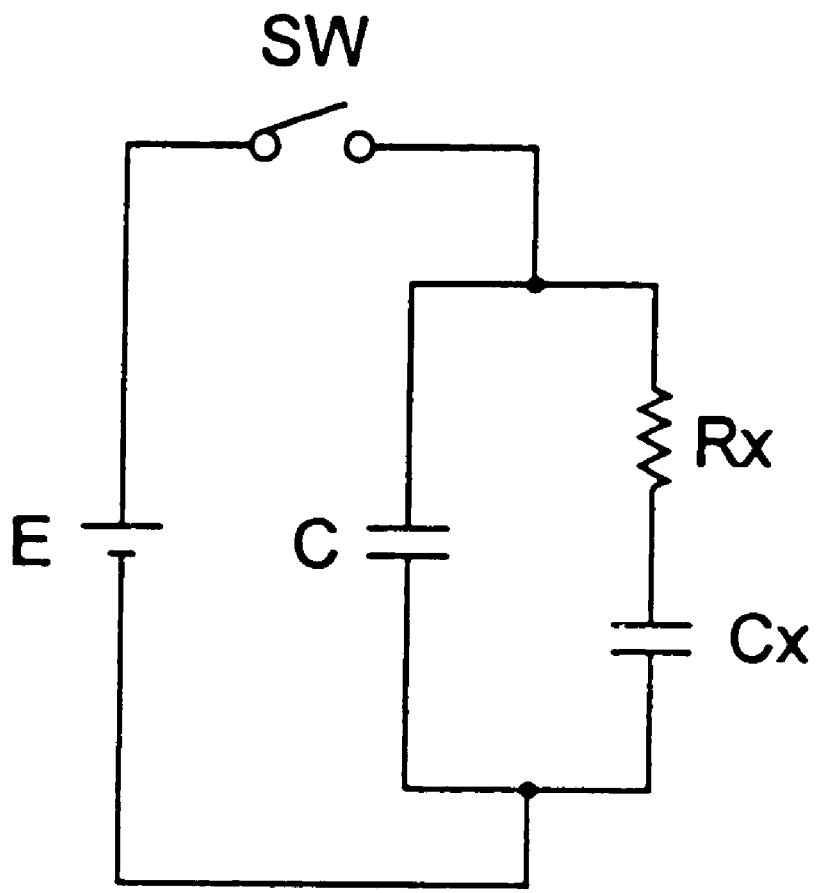
FIG. 3 is a diagram of an equivalent circuit for explaining dielectric absorption of a condenser.

The embodiments according to the invention will now be described in more detail in conjunction with the accompanying drawings, wherein the same or similar reference numerals represent the same elements to avoid duplication of explanation. Although the embodiments according to the present invention are described below regarding active distance measurement systems applied as those for using in automatic focussing cameras, the invention is certainly not limited thereto.

Figure 4:
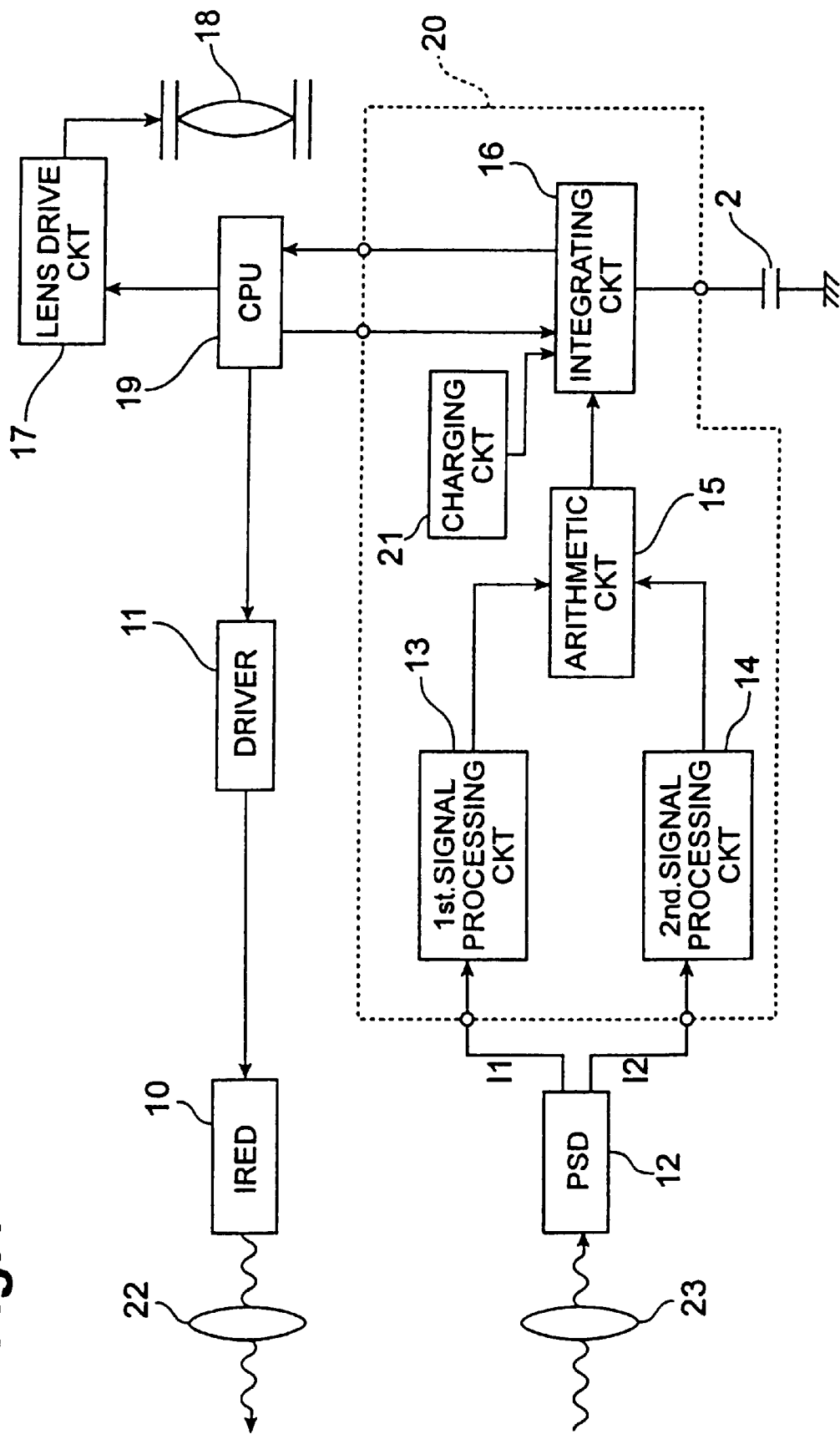
FIG. 4 is a block diagram of a distance measurement system according to an embodiment of the present invention.

FIG. 4 illustrates in a block diagram a distance measurement system according to one embodiment of the present invention. The distance measurement system is provided with an infrared-emitting diode (IRED) 10 for emitting infrared radiation through a light-projecting lens 22 toward an object (subject of distance measurement), a driver 11 for driving the IRED 10, and a position sensitive detector (PSD) 12 receiving through a light-receiving lens 23 the infrared radiation emitted by the IRED 10 and reflected by the subject of distance measurement.

The distance measurement system further comprises first and second signal processing circuits 13 and 14 for processing, respectively, signal currents I1 and I2 outputted from the PSD 12, an arithmetic circuit 15 for operating information regarding a distance of the distance measurement object based on the signals outputted from these signal processing circuits 13 and 14, an integrating circuit 16 for integrating the operated distance information outputted by the arithmetic circuit 15, a charging circuit 21 for on-off control of a switch 9 provided in the integrating circuit 16, a taking lens 18 for producing an image of the object (subject of distance measurement) on a taking film, a lens drive circuit 17 for driving the taking lens 18 to enable the latter to perform the focussing operation, and a central processing unit (CPU) 19 for controlling the whole of a camera including therein the above distance measurement system. In addition, it is noted that the first signal processing circuit 13, the second signal processing circuit 14, the arithmetic circuit 15, the integrating circuit 16 and the charging circuit 21 are mounted to the camera with their being consolidated into an autofocus integrated circuit (AFIC) 20.

The CPU 19 controls the whole of the distance measurement system-mounting camera based on programs and parameters preliminarily stored in a memory (not shown), such as an electrically erasable and programmable read-only memory (EEPROM). Specifically, the CPU 19 controls the driver 11 to bring the infrared output of the IRED 10 under control and also controls the operation of the AFIC 20. Furthermore, the CPU 19 receives the signal outputted from the AFIC 20, determines the distance to the distance measurement object based on the above signal, and enables the taking lens 18 to perform the focussing operation through the lens drive circuit 17.

Under the control of the CPU 19, the IRED 10 first emits infrared radiation through the light-projecting lens 22 toward the object of distance measurement. This infrared radiation is reflected from the distance measurement object and the PSD 12 receives the reflected infrared radiation through the light-receiving lens 23. The PSD 12 outputs the signal currents I1 and I2 in accordance with the infrared receiving positions. The first signal processing circuit 13 receives at its input the signal current I1 outputted from the PSD 12 and the second signal processing circuit 14 receives at its input the signal current I2 outputted from the PSD 12, each circuit performing processings such as removal of a standing-light component. The arithmetic circuit 15 accepts the inputs from the first and second signal processing circuits 13 and 14 to determine data corresponding to an output ratio I1/(I1+I2) of the PSD 12, which data is outputted as a distance information signal.

During one distance measurement operation, the predetermined number (for example 256) of infrared pulses are emitted and the arithmetic circuit 15 outputs distance information signals corresponding in number to the emitted infrared pulses. Thus, the integrating circuit 16 performs the integration processing of the distance information signals corresponding in number to the emitted infrared pulses and outputs the result of the integration to the CPU 19 as a single piece of distance information. The CPU 19 determines a distance to the distance measurement object based on the inputted distance information and controls the lens drive circuit 17 so as to move the taking lens 18 into an in-focus position.

Because a diagram of the integrating circuit 16 used in the distance measurement system according to the embodiments may be substantially consistent with that having been already explained with respect to FIG. 1, reference is to be made to FIG. 1 as needed. The integrating circuit 16 in the present embodiment is provided with an integrating capacitor 2 comprising a ceramic condenser attached external to the AFIC 20. As shown in FIG. 1, the integrating circuit 16 in the present embodiment comprises a switch 1, a switch 3, a constant current source 4, an operational amplifier 5, a switch 6, a reference power supply 7, a comparator 8 and a switch 9, in addition to the above integrating capacitor 2. The inverting terminal (−) of the operational amplifier 5 is connected through the switch 1 to the output terminal of an arithmetic circuit 15 and grounded through the integrating capacitor 2. Also, the amplifier inverting terminal (−) is connected through the switch 3 to the constant current source 4, through the switch 9 to the terminal of a power supply voltage $V_{CC}$, and through the switch 6 to the output terminal of the operational amplifier 5. The non-inverting terminal (+) of the operational amplifier 5 is connected to the reference power supply 7, which provides a reference voltage $V_{REF}$. The comparator 8 is connected to the junction between the inverting terminal (−) of the operational amplifier 5 and the integrating capacitor 2 and compares the potential of the junction and the reference voltage $V_{REF}$ to find out which is higher. The comparator 8 outputs a signal corresponding to the comparison result. The CPU 19 receives the signal outputted from the comparator 8 and controls the on-off operation of the switches 1, 3 and 6. However, the charging circuit 21 controls the on-off operation of the switch 9.

Figure 5:
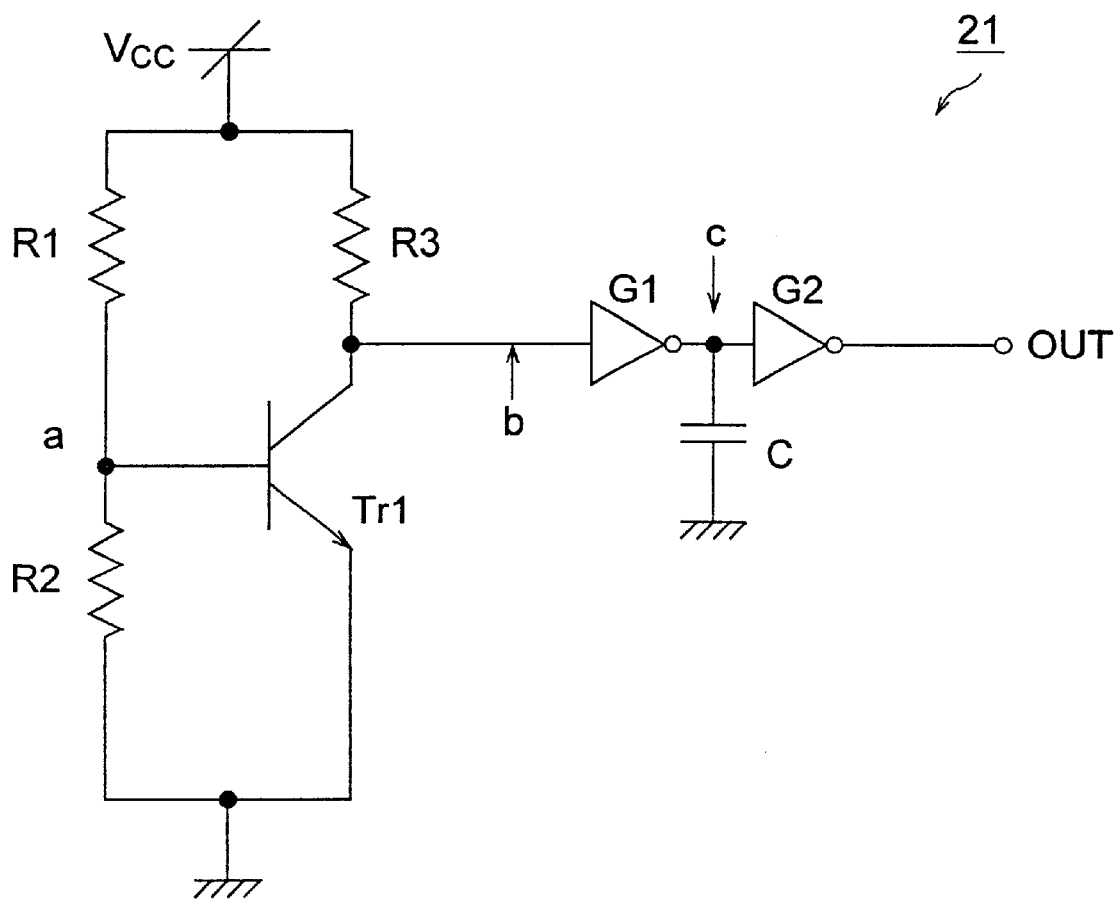
FIG. 5 is a circuit diagram showing a charging circuit in the distance measurement system according to the above embodiment.

FIG. 5 shows in detail the charging circuit 21 in the distance measurement system according to the preferred embodiment. The charging circuit 21 shown in this figure is adapted to turn the switch 9 to the "on" state during a definite period of time after the start of power supply by introducing the supply voltage. The charging circuit 21 is composed of a transistor Tr1, resistors R1–R3, inverters G1–G2, and a capacitor C.

A base of the transistor Tr1 is connected through the resistor R1 to the supply voltage terminal and grounded through the resistor R2. A collector of the transistor Tr1 is connected through the resistor R3 to the supply voltage terminal, and an emitter thereof is grounded directly. Furthermore, the collector of the transistor Tr1 is connected to the input terminal of the inverter G1, and the output terminal thereof is connected to the input terminal of the inverter G2 and grounded through the capacitor C. An "OUT" signal that is outputted from the output terminal of the inverter G2 controls the on-off operation of the switch 6. By way of example, values of resistance of the resisters R1–R3 are 7.5 KΩ, 1.8 KΩ and 30 KΩ, respectively.

Figure 6:
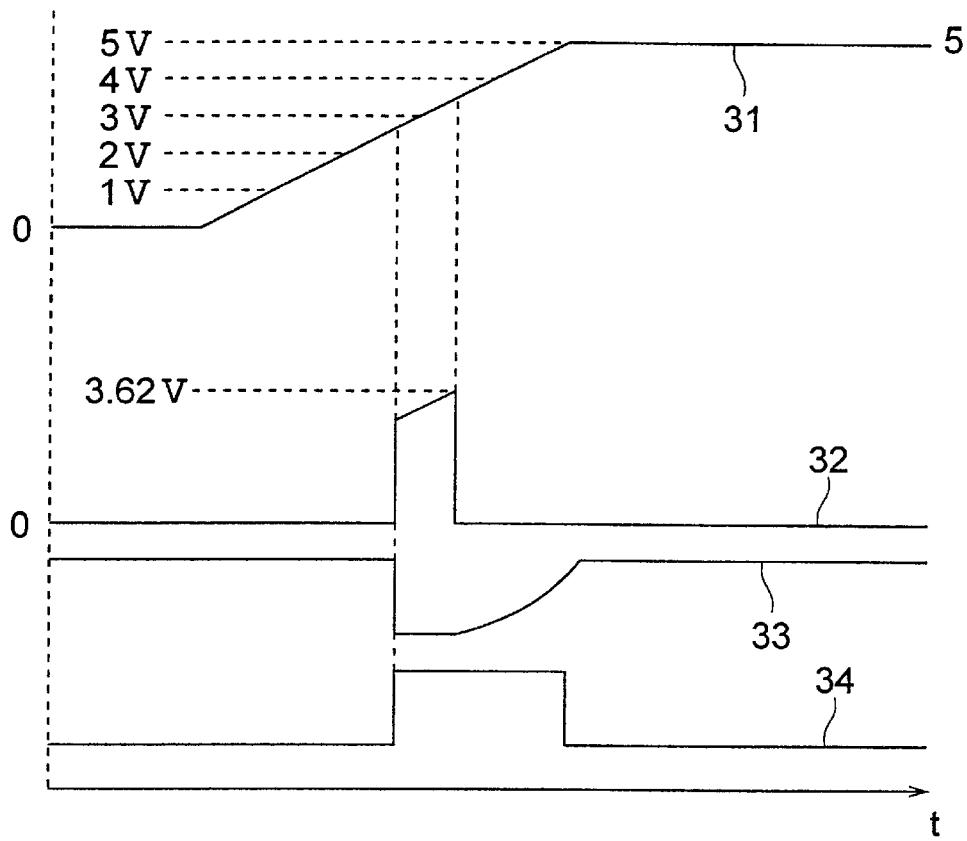
FIG. 6 is a timing chart for explaining the operation of the charging circuit in the above distance measurement system.

The operation of the charging circuit 21 in the above distance measurement system according to the preferred embodiment will be explained below by reference to timing charts of FIG. 6. In FIG. 6, the timing charts 31 to 34 relate, respectively, to a voltage level of the supply voltage $V_{CC}$, a collector potential (electric potential at a point "b" in FIG. 5) of the transistor Tr1, an output potential (electric potential at a point "c" in FIG. 5) of the inverter G1, and an output potential of the "OUT" signal in FIG. 5. When the supply of the voltage from the power source starts, the level of the supply voltage $V_{CC}$ increases from 0 to 5 volts. When the level of the supply voltage $V_{CC}$ exceeds about 3.0 volts during the course of increase in the supply voltage $V_{CC}$, the collector potential (electric potential at the point "b" in FIG. 5) of the transistor Tr1 reaches to the level substantially equal to the supply voltage $V_{CC}$; the output potential (electric potential at the point "c" in FIG. 5) of the inverter G1 descends; and the "OUT" signal from the inverter G2 becomes a "high" level. When the level of the supply voltage $V_{CC}$ further increases in excess of 3.62 volts, a base potential (electric potential at a point "a" in FIG. 5) of the transistor Tr1 exceeds 0.7 volts. This allows a collector current to flow through the transistor Tr1 and the collector potential (electric potential at the point "b" in FIG. 5) of the transistor Tr1 becomes a ground potential. Then, the output potential (potential at a point shown by "c" in FIG. 5) of the inverter G1 progressively increases. When the input potential of the inverter G2 exceeds a predetermined threshold during the course of increase in the output potential of the inverter G1, the "OUT" signal from the inverter G2 changes to "low" level.

As understood from the foregoing, when the supply of the voltage from the power source starts, the charging circuit 21 outputs the pulse signals having pulse duration determined by a capacity of the capacitor C. The switch 9 is retained in the "on" state only for a definite period of time during which the "OUT" signal outputted from the charging circuit 21 is in "high" level, so that the integrating capacitor 2 is overcharged. Then, voltage drops occur due to dielectric absorption in the integrating capacitor 2.

Furthermore, the CPU 19 controls the operation of a not shown regulator, which is to stably furnish camera components (excepting the CPU 19 itself) with the supply voltage, so as to stop the power supply and to set in a standby mode if no manipulation of the camera is performed within a certain period of time (for example, 5 minutes) and so as to release the standby mode to restart the power supply if any manipulation is performed at the standby mode. The CPU 19 also overcharges the integrating capacitor 2 for a definite period of time after the release of the standby mode.

Figure 7:
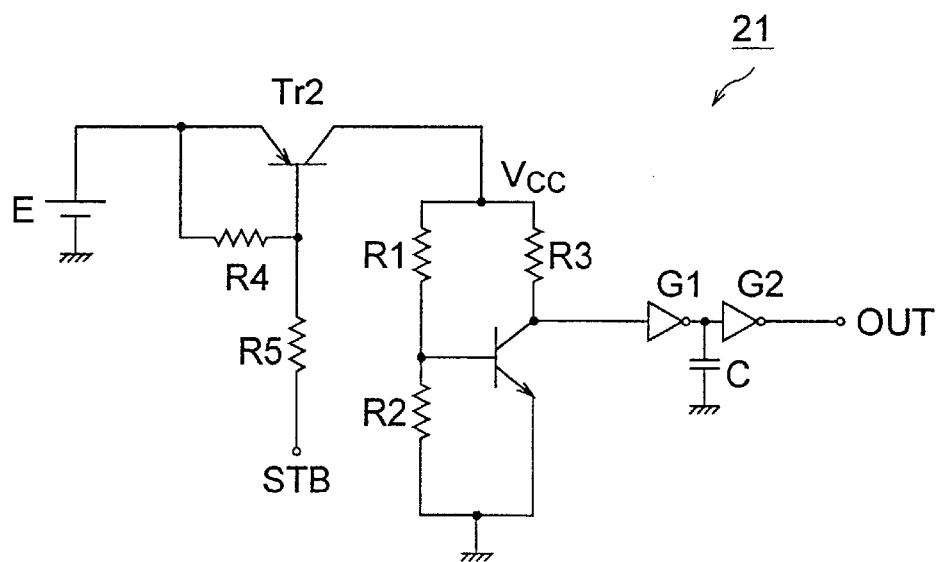
FIG. 7 is a circuit diagram showing a modification of the charging circuit.

FIG. 7 shows a modification of the charging circuit, which is designed to overcharge the integrating capacitor 2 for the definite period of time after the release of the standby mode. The circuit diagram of FIG. 7 further includes, in addition to the elements shown in FIG. 5, a battery E, a transistor Tr2, and resistors R4 and R5. The emitter of the transistor Tr2 is directly connected to the battery E and also to the base through the resistor R4. The base of the transistor Tr2 is connected through the resistor R5 to the CPU 19 to receive an STB signal output from the CPU 19. The collector of the transistor Tr2 is connected to the resistors R1 and R3.

The STB signal is a signal to indicate which one of the standby mode and the operation mode is set. When the STB signal is at "high" level, the standby mode is selected. At that time, the supply voltage $V_{CC}$ is null. When the STB signal is at "low" level, the operation mode is selected. At that time, the supply voltage $V_{CC}$ is a voltage supplied from the battery E. At the moment the standby mode is released, the STB signal changes from "high" to "low" level, when the supply voltage $V_{CC}$ increases to the voltage supplied from the battery E and the inverter G2 outputs the pulse signal of a predetermined duration to charge the integrating capacitor 2.

Figure 8:
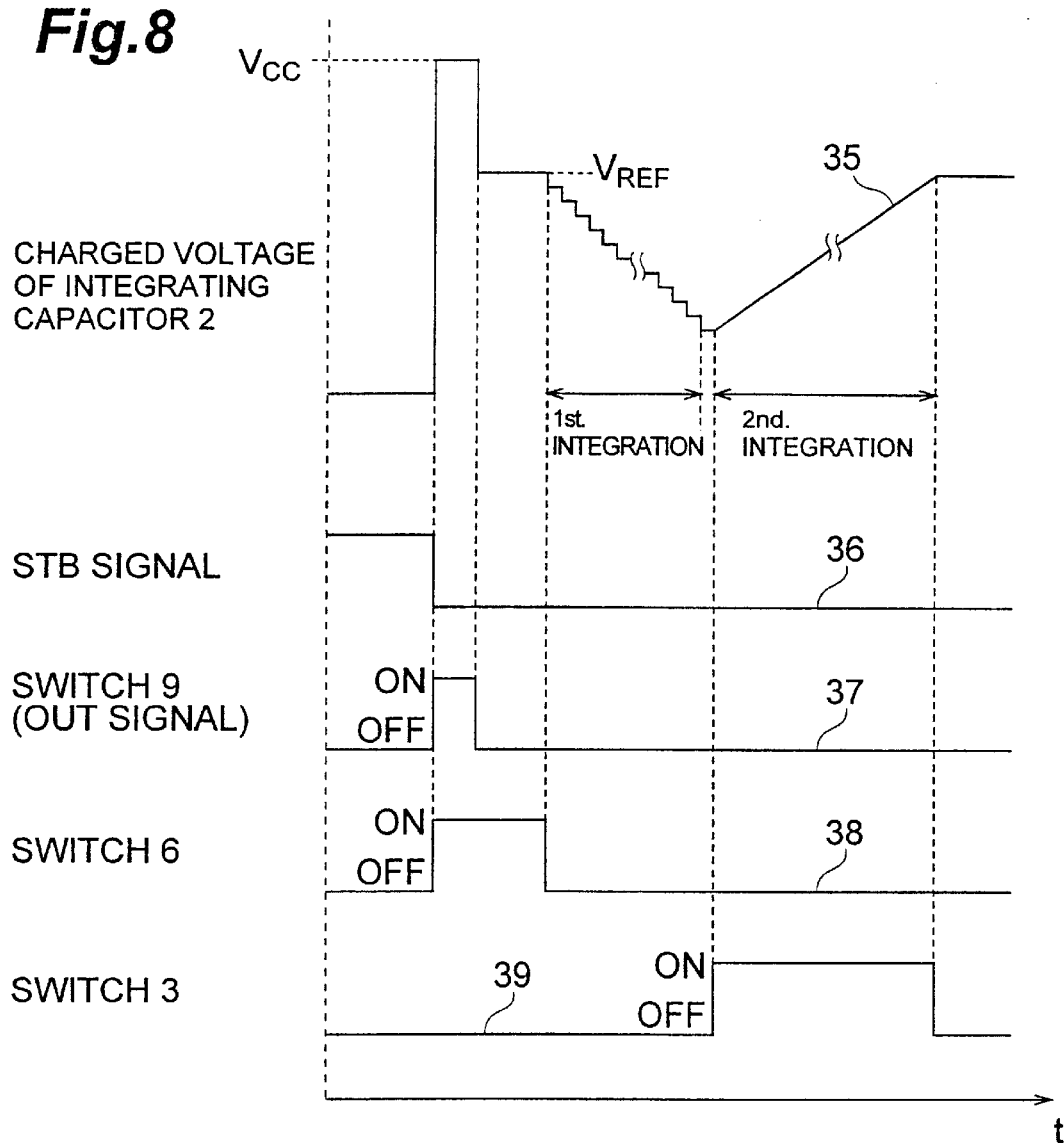
FIG. 8 is a timing chart for explaining the distance measuring operation of the distance measurement system according to the above embodiment.

Next, the operation of the distance measurement according to the aforementioned preferred embodiment would be explained, in which the charging circuit 21 shown in FIG. 7 is employed. FIG. 8 shows different timing charts for explaining the distance measuring operation of the distance measurement system according to the above embodiment. In FIG. 8, the timing charts 35 to 39 relate, respectively, to the integrating capacitor 2 (charging voltage), the STB signal, the switch 9 ("OUT" signal), the switch 6, and the switch 3.

When the release button is half depressed a series of distance measuring procedures start. If the distance measuring procedures start, the AFIC 20 is allowed to restart furnishing the power supply voltage and the STB signal changes from "high" to "low" level. In contrast, the "OUT" signal outputted from the charging circuit 21 is changed to and maintained in "high" level during the constant period of time, only for which the switch 9 is retained in the "on" state. Thus, the integrating capacitor 2 is overcharged to the supply voltage $V_{CC}$. The switch 6 is also turned to the "on" state under the control of the CPU 19, so that the integrating capacitor 2 can be charged to the reference voltage $V_{REF}$ even after the end of the overcharging.

After the charging to the reference voltage $V_{REF}$, the IRED 10 is driven by an emission timing signal having a duty ratio outputted from the CPU 19 to the driver 11. As a result, the predetermined number (for example, 256) of infrared radiation pulses are emitted. The infrared radiation emitted from the IRED 10 is reflected from the object of distance measurement and received by the PSD 12. The arithmetic circuit 15 outputs the data of output ratio I1/(I1+I2) for each emission and the integrating circuit 16 receives the data as a distance information signal. The CPU 19 controls the switch 1 so as to be repeatedly turned to "on" and "off" at the timing corresponding to the pulsed emission of the IRED 10 to cause a negative voltage corresponding to the output ratio to be inputted into the integrating capacitor 2.

Thus, the integrating capacitor 2 in the integrating circuit 16 receives the distance information signals outputted from the arithmetic circuit 15 and discharges a charge corresponding in value to the magnitude of each distance information signal. In other words, the voltage across the integrating capacitor 2 decreases step by step whenever receiving each distance information signal (first integration). An amount of voltage drop per each step may represent by itself distance information corresponding to a distance to an object of distance measurement. However, in the preferred embodiments, distance information is defined as a sum of voltage drops each developed by one pulsed emission of the IRED 10.

Even after the integrating capacitor 2 has received the predetermined number of inputs corresponding to the number of emissions, the switch 6 is maintained in its "off" state. However, the switch 3 is turned to the "on" state by the signal from the CPU 19. This causes the integrating capacitor 2 to be charged at a predetermined rate determined by the rating of the constant current source 4 (second integration).

During the period of the second integration, the comparator 8 compares the voltage of the integrating capacitor 2 and the reference voltage $V_{REF}$ to find out which is higher and when determined that they are coincident with each other, causes the switch 3 to be turned to the "off" state. This causes the charging of the integrating capacitor 2 to be stopped and the CPU to commence determining a time required to perform the second integration. As the charging by the constant current source 4 is uniform in rate, the sum of the signal voltages inputted in the integrating capacitor 2 during one distance measurement, that is, the distance to the object of the distance measurement can be determined from the aforementioned time required to perform the second integration.

Subsequently, the release button is fully depressed and then the CPU 19 operates to control the lens drive circuit 17 based on the determined distance so as to appropriately adjust the focus of the taking lens 18. Also, a shutter (not shown) opens causing exposure to light. In this manner, the release operation can be followed by the aforementioned series of shooting procedures comprising the charging, the distance measuring (first and second integration), the focussing and the exposing.

According to the present embodiments, the integrating capacitor 2 in the integrating circuit 16 is overcharged to the potential level higher than the reference voltage $V_{REF}$ for the constant period of time after the start of the power supply and at that time, the voltage drop occurs due to the dielectric absorption in the integrating capacitor 2. Thus, the voltage drop due to the dielectric absorption in the integrating capacitor 2 can be prevented during the subsequent charging at the start of the distance measurement, preventing the occurrence of the distance measurement error. Furthermore, no wiring is required for control signals from the CPU 19 to instruct that switch 9 is turned to the "on" state to overcharge the integrating capacitor 2. So, terminals of the AFIC 20 can be diminished in number.

Figure 9:
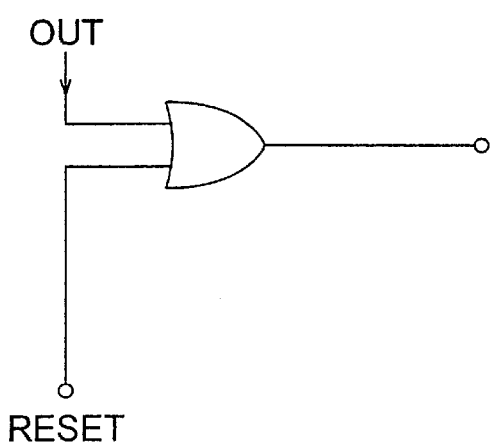
FIG. 9 is a circuit diagram showing another modification of the charging circuit.

In addition, as shown in FIG. 9, the AFIC 20 may favorably be designed so that logical OR operation is implemented based on the "OUT" signal outputted from the charging circuit 21 and the "RESET" signal from the CPU 19 and the resultant output signal controls the on-off operation of the switch 9 to overcharge the integrating capacitor 2. In such a modification, the integrating capacitor 2 can be overcharged not only automatically for the definite period of time after the start of the power supply or after the release of the standby mode, but also forcibly by the "RESET" signal outputted from the CPU 19. Even in this modification, wiring can be simplified, as the RESET terminal of the AFIC 20 receiving the RESET signal may remain grounded.

The present invention is not limited to the aforementioned embodiments and many modifications can be made thereto. For example, the invention is also applicable to a system including such an integrating circuit, in which charging and discharging of an integrating capacitor are carried out in a manner contrary to that in the aforementioned embodiments. That is, during the period of the first integration, the integrating capacitor 2 is charged so that the voltage level thereof ascends step by step and then discharged at a time in the second integration.

While the distance to the object is obtained on the basis of the time needed in the second integral, it may also be obtained on the basis of the result of the A/D conversion of the integral voltage value obtained by the first integral, namely, the voltage value which is reduced due to the discharge of integral capacitor or the voltage value which is increased due to the charge of integral capacitor.

As heretofore described in greater detail, according to the present invention, when the charging means detects the start of the power supply or the release of the standby mode, the integrating capacitor of the integrating means is overcharged by the charging means for the predetermined period of time after the detection to the voltage level higher than the reference voltage. During the overcharging, the voltage drop occurs due to the dielectric absorption in the integrating capacitor, resulting in high accuracy of distance measurement accomplished subsequent to the overcharging. Furthermore, as no additional signals are required to command the overcharging of the integrating capacitor, terminals and wiring may be simplified when the associated elements are incorporated into an integrated circuit.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measurement system comprising:
   means for emitting a beam of light toward an object at a distance to be measured;
   light detecting means including a position sensitive detector for detecting light from the beam of light reflected from the object, at a detecting position on said position sensitive detector corresponding to the distance to the object, said light detecting means outputting a signal corresponding to the detecting position;
   arithmetic means for carrying out a calculation based on the signal output from said light detecting means to output a signal corresponding to the distance to the object;
   integrating means including an integrating capacitor charged to a reference voltage for integrating the signal output from said arithmetic means over time by charging and discharging said integrating capacitor by an amount corresponding to the signal output from said arithmetic means, said integrating means outputting a signal corresponding to the integration;
   means for determining the distance to the object based on the signal output from said integrating means;
   control means for controlling said integrating means for charging and discharging said integrating capacitor; and
   charging means for detecting whether a supply of power to said distance measurement system has started, and for overcharging said integrating capacitor of said integrating means to a voltage higher than the reference voltage for a fixed period of time, following starting of the supply of power to said distance measurement system, wherein operation of said charging means is independent of and not controlled by said control means.

2. The distance measurement system according to claim 1, wherein said control means sets said distance measurement system in a standby mode, suspending the supply of power to said distance measurement system when no operation is carried out during a period of time, and releases the standby mode, restarting the supplying of power to said distance measurement system when any operation is carried out during the standby mode, and said charging means detects when the standby mode is released and overcharges said integrating capacitor of said integrating means to a voltage level higher than the reference voltage for the limited period of time after release of the standby mode.

3. The distance measurement system according to claim 1, wherein said light emitting means is an infrared-emitting diode.

4. The distance measurement system according to claim 1, wherein said light detecting means outputs a plurality of signals corresponding to the detecting position.

5. The distance measurement system according to claim 4, wherein said arithmetic means carries out the calculation based on a power ratio of the signals output from said light detecting means.

6. The distance measurement system according to claim 1, wherein said arithmetic means, said integrating means, and said charging means are consolidated into an automatic focussing integrated circuit.

7. The distance measurement system according to claim 1, wherein said charging means comprises a switch turning on for the fixed period of time after starting of a supply of power to said distance measurement system and including a voltage divider having two resistors connected at a node, the voltage divider being connected between a power supply and ground, a transistor connected in parallel with said voltage divider, having a control electrode connected to the node, and an output electrode coupled to said integrating circuit, and a capacitor coupled between the output electrode and ground.

8. A distance measurement system comprising:

means for emitting a beam of light toward an object at a distance to be measured;

light detecting means including a position sensitive detector for detecting light from the beam of light reflected from the object, at a detecting position on said position sensitive detector corresponding to the distance to the object, said light detecting means outputting a signal corresponding to the detecting position;

arithmetic means for carrying out a calculation based on the signal output from said light detecting means to output a signal corresponding to the distance to the object;

integrating means including an integrating capacitor charged to a reference voltage for integrating the signal output from said arithmetic means over time by charging and discharging said integrating capacitor by an amount corresponding to the signal output from said arithmetic means, said integrating means outputting a signal corresponding to the integration;

means for determining the distance to the object based on the signal output from said integrating means;

control means for setting said distance measurement system in a standby mode, suspending the supply of power to said distance measurement system, when no operation is carried out during a period of time, and for releasing the standby mode, thereby restarting the supplying of power to said distance measurement system, when any operation is carried out during the standby mode; and charging means for detecting when the standby mode is released and for overcharging said integrating capacitor of said integrating means to a voltage level higher than the reference voltage for a fixed period of time upon release of the standby mode.

9. The distance measurement system according to claim 8, wherein said charging means comprises first and second switches connected in series between a power supply for said distance measurement system and said distance measurement, wherein said first switch turning on in response to release of the standby mode, thereby connecting the power supply to the second switch, and said second switch comprises a voltage divider having two resistors connected at a node, the voltage divider being connected between said first switch and ground, a transistor connected in parallel with said voltage divider, having a control electrode connected to the node, and an output electrode coupled to said integrating circuit, and a capacitor coupled between the output electrode and ground.

* * * * *